United States Patent Office 2,919,282
Patented Dec. 29, 1959

2,919,282

REDUCTION OF PHTHALIMIDE

Robert E. Howard, Brentwood, and Emery B. Miller, St. Louis, Mo., assignors to Monsanto Chemical Company, St. Louis, Mo., a corporation of Delaware No Drawing. Application April 27, 1953
Serial No. 351,521

7 Claims. (Cl. 260—343.3)

This invention relates to the reduction of phthalimide and more specifically pertains to a process for preparing phthalide by the reduction of phthalimide.

Phthalide is useful as an intermediate in the synthesis of other organic compounds, for example phthalide is employed as an intermediate in the synthesis of phthalazone from which antihypertension drugs are made.

One method proposed for reducing phthalimide to phthalide is described by Reissert Ber., vol. 46, 1489 (1913). This process comprises adding slowly 1 gram mole of phthalimide to an aqueous composition containing 2.75 gram atoms of zinc dust and 2 gram moles of sodium hydroxide in 355 grams of water cooled to 5° C. The addition of phthalimide is maintained at such a rate as to keep the reaction temperature from exceeding 8° C. After the addition of phthalimide has been completed, the reaction mixture is diluted, heated until ammonia no longer comes off, concentrated to 400 cc. under reduced pressure and then filtered to remove zinc oxide and unreacted metallic zinc. The filtrate is acidified and boiled to complete lactonization. By this process it is said that a yield of 95.6% of phthalide melting at 73°–74° C. can be obtained.

Another method for the reduction of phthalimide to phthalide is described in Organic Synthesis, volume 16, 71–72 (1936). This process follows the procedure described above but employs 1 gram of copper sulfate per mole of phthalimide in addition to the other materials. It is reported that by this process a 67% to 71% yield of phthalide melting at 72–73° C. can be obtained. The authors also report that when copper sulfate was eliminated from the reaction system total failure was experienced.

The zinc caustic reductions of phthalimide reported in the literature obviously do not produce consistent yields of phthalide. Furthermore, considerable difficulty has been experienced with these processes. One of the most serious processing difficulties encountered in the zinc caustic reduction of phthalimide is encountered in the filtration step where zinc oxide and unreacted metallic zinc are removed from the reaction mixture by filtration. The filter cake containing mainly zinc oxide and some metallic zinc does not behave the same from one filtration to another. Infrequently this filter cake remains sufficiently porous so that filtration can be accomplished in a few hours. But more frequently the filter cake packs and becomes impervious making further filtration substantially impossible. In either case the filtration consumes more time than is economically feasible for succesful industrial applications. Furthermore, the filter cake contains pyrophoric zinc and presents a considerable industrial hazard.

It has now been discovered that phthalide can be prepared by the caustic reduction of phthalimide employing such metals as aluminum, cadmium, magnesium, tin and zinc without employing copper or an inorganic copper salt. This process avoids an uneconomical and hazardous filtration step and avoids the use of excessively large quantities of these metals. This process comprises reducing phthalimide in an aqueous medium containing a strong base, preferably an alkali metal hydroxide, in the proportion of two equivalents of the strong base per mole of phthalimide and an amount of finely divided aluminum, cadmium, magnesium, tin or zinc which is slightly in excess of the quantity of metal theoretically required to liberate four hydrogen atoms per mole of phthalimide. The quantty of metal employed should be in the range of from about 1.01 to 1.2 times and preferably 1.01 to 1.1 times that theoretically required to produce four hydrogen atoms per mole of phthalimide.

In general the process is carried out in the following manner. A mixture comprising the finely divided metal and water is slurried together and cooled to room temperature or below. The strong base is added to the slurry with stirring and additional cooling to maintain a temperature of from 30° C. to 0° C. or below. Phthalimide is added slowly to this alkaline slurry while removing heat given off by the exothermic reaction taking place to maintain a reaction temperature in the above range until the exothermic reaction is substantially complete. The resulting reaction mixture is heated to a temperature above 50° C. but not in excess of the boiling point of the reaction mixture to drive off ammonia. This hot reaction mixture is acidified with a concentrated mineral acid preferably by simultaneously combining the hot reaction mixture and the mineral acid as rapidly as the heat of dilution and neutralization can be removed so that the temperature of resulting acidified mixture does not exceed its boiling point. Sufficient mineral acid is added to obtain a final pH from about 1.0 to about 3.5. The resulting acidic aqueous mixture is held at a temperature of from 90° C. to the boiling point of the mixture for a short period of time, cooled to about 75° C. and allowed to settle. The organic layer which forms on top is recovered, washed with water and dried. By this process phthalide yields of 90% and above having crystallizing points in the range from 70° to about 74° C. can be consistently obtained.

For the purposes of this invention any strongly alkaline hydroxide can be employed, but the use of potassium hydroxide or sodium hydroxide is preferred because of the availability of these hydroxides in a relatively pure form and a low cost. For the acidification step, hydrochloric acid, sulfuric acid, or any other mineral acid can be employed.

To achieve the best results when following the practices of this invention, it has been found to be desirable to employ metallic dusts having a sufficiently small particle size so that at least 95% of the dust will pass through a 325 mesh screen. Metallic dusts reduced to particle size finer than 325 mesh when available will be found to be slightly superior to the 325 mesh particle. It has been found that the efficiency of the reduction of phthalimide to phthalide by the process of this invention is dependent upon the surface area of the metal employed. Consequently, the most efficient and rapid reduction processes are obtained when the metal dust employed contains a high percentage of particles of from 325 to 425 mesh or smaller.

The following examples wherein the term "parts" is employed to indicate parts by weight illustrate the process of this invention in detail.

*Example I*

Into a suitable reactor fitted with a bottom outlet, a reflux condenser, a means for measuring the temperature of the reaction mixture, a means for cooling, and a stirring device there is charged 400 parts of water and 155.5 parts, a 4% excess, of zinc dust (98% of which is finer than 325 mesh). This mixture is stirred and cooled to a temperature of from 10–30° C. while 186 parts of 50% sodium hydroxide are added. After the addition of caustic is complete, the resulting aqueous mixture is stirred and cooled to 10° C. and there is added thereto 168.3 parts of phthalimide over a period of about an hour while maintaining a reaction temperature between 10° C. and 15° C. After all the phthalimide is added, the reaction temperature is held at a maximum of 15° C. for 105 minutes. The aqueous reaction mixture is heated slowly with caution to boiling. The reaction mixture becomes quite thick and evolution of ammonia causes heavy foaming at about 80° to 85° C. However, as long as the reaction temperature is not increased rapidly above about 85° C., the foaming does not present a serious problem. As the tendency to foam decreases, the reaction mixture is heated to and maintained at reflux for about an hour.

The resulting hot mixture together with 66° Baumé sulfuric acid is added to a reactor fitted with a means for removing heat, an agitator, means for measuring the temperature of the reaction mixture and pH meter electrodes. The addition of the sulfuric acid to the hot reaction mixture is maintained at such a rate as to obtain efficient heat removal to maintain a temperature between 90° and about 110° C. and to obtain a pH within the range of about 2.5 to about 3.5. The resulting acidified aqueous mixture is held at about 90° to 95° C. for 30 minutes during which time the pH is adjusted to about 3.0. The total amount of 66° Baumé sulfuric acid required is about 360 parts. The acidified aqueous mixture is cooled to 75° C. and allowed to settle for about 10 minutes during which time a phthalide layer comes to the top, undissolved inorganic salts go to the bottom, and a middle aqueous layer which is saturated with inorganic salts forms. The aqueous layer is removed from the reactor and discarded. There is then added to the phthalide layer and solid inorganic salts about 310 parts of hot (75° to 95° C.) water, and the resulting mixture is stirred for a few minutes to dissolve the inorganic salts. This mixture is brought to about 75° C. and allowed to settle. The lower water layer is drained to the sewer and the organic layer is washed with water and dried at 100° C. at 40 mm. Hg absolute with agitation. In this manner 145.6 parts, a 94.7% yield, of old rose colored crystalline phthalide having a crystallizing point of 70°–71° C. is obtained.

*Example II*

The process described in Example I is repeated except that the quantity of zinc employed is 1.03 times the theoretical quantity of zinc required to produce 4 atoms of hydrogen per mole of phthalimide, that is, a 3% excess of zinc. The quantity of 66° Baumé sulfuric acid employed to acidify the hot reaction mixture is 345 parts. By this process there is obtained a 92% yield of phthalide having a crystallizing point of 70° C.

*Example III*

The process described in Example I is repeated except that a 5% excess of zinc is employed and 365 parts of sulfuric acid are used to acidify the hot reaction mixture. By this process there is obtained a 91.2% yield of phthalide crystallizing at 70.2° C.

*Example IV*

The process described in Example I is repeated except that the temperature of the reaction medium prior to and for one hour after the addition of phthalimide was maintained within the range of 20° to 25° C. The removal of ammonia and recovery of phthalide is the same. By this process there is obtained a 90% yield of phthalide having a crystallization point of 70° C.

*Example V*

The process described in Example I is repeated except that a 20% excess of zinc is employed and sufficient concentrated hydrochloric acid (37%) is added to acidify the hot reaction mixture. Also the step of adding the hot water to dissolve the inorganic salts was omitted because all the inorganic salts remained in solution in the aqueous phase due to the addition of the extra water with the hydrochloric acid. By this process yields of phthalide of 90% or higher having a crystallizing point above 70° C. can be obtained.

*Example VI*

The process described in Example I is repeated except that the theoretical amount of zinc required to produce four hydrogen atoms per mole of phthalimide is employed and sufficient 66° Bé. sulfuric acid is added to acidify the hot aqueous reaction mixture. By this process there is obtained a 98% yield of an oily organic product containing phthalide and a considerable amount, 3 to 5% by weight, of phthalic acid as indicated by the low crystallizing point of 68° C.

The results of Examples I through V clearly indicate that a slight excess of zinc is required to produce high yields of substantially pure phthalide. This fact is clearly illustrated by Example VI which employed the theoretical quantity of zinc required by the alkaline reduction reaction where although an apparently high yield of phthalide was recovered, this product contained an excessive quantity of ortho-phthalic acid.

The products obtained in the processes described in Examples I to V are considered to be sufficiently pure for use as an intermediate in the synthesis of phthalazone.

An alternative process for reducing phthalimide by the method of this invention comprises making a slurry of the metal dust and water, and adding the strong base and phthalimide simultaneously to the slurry in the molar ratio of two moles of base per mole of phthalimide.

What is claimed is:

1. In the process for preparing phthalide by the alkaline reduction of phthalimide, the steps comprising carrying out said reduction at a temperature below about 30° C. in the presence of a strongly alkaline hydroxide and a quantity of a finely divided zinc from at least 1.01 to 1.2 times the quantity theoretically required to liberate four hydrogen atoms per mole of phthalimide, heating the resulting mixture to drive off ammonia as rapidly as possible, acidifying the resulting hot alkaline reaction mixture with a mineral acid to a pH of from 1.0 to 3.5 and heating the resulting acidic aqueous mixture to a temperature not exceeding the boiling point of said mixture.

2. In the process for preparing phthalide by the alkaline reduction of phthalimide, the steps comprising combining phthalimide, a strong base and an aqueous slurry of zinc dust at a temperature below about 30° C. to form a reaction mixture containing for each mole of phthalimide at least two equivalents of the strong base and from 1.01 to 1.20 times the quantity of zinc required to liberate four atoms of hydrogen, maintaining this reaction mixture at a temperature below about 30° C. until the exothermic reaction taking place is substantially complete, heating the resulting mixture above 50° C. but not above its boiling point to drive off the ammonia formed, and acidifying the resulting aqueous medium with a mineral acid to a pH of 1.0 to 3.5.

3. The process of claim 2 wherein the strong base is sodium hydroxide.

4. The process comprising combining phthalimide and sodium hydroxide with an aqueous slurry of zinc dust at a temperature below 30° C. to form a reaction mixture containing for each mole of phthalimide at least two equivalents of sodium hydroxide and from 1.01 to 1.1 times the quantity of zinc required to liberate four atoms of hydrogen, maintaining this reaction mixture at a temperature below about 30° C. until the exothermic reaction taking place is substantially complete, heating the resulting mixture above 50° C. but not above its boiling point to drive off the ammonia formed, acidifying the resulting hot reaction mixture with a mineral acid to a pH of from 1.0 to 3.5, heating the resulting acidic mixture to substantially the boiling point of the mixture, cooling the acidic mixture to about 75° C. and recovering the phthalide formed.

5. The process of claim 4 wherein the mineral acid is sulfuric acid.

6. The process of claim 4 wherein the mineral acid is hydrochloric acid.

7. The process of claim 4 wherein the acidification step is accomplished by simultaneously combining the deammoniated reaction mixture and concentrated sulfuric acid.

References Cited in the file of this patent

FOREIGN PATENTS 267,596     Germany ---------------- Nov. 24, 1913

OTHER REFERENCES

Reissert: Ber. Deut. Chem., vol. 46, p. 1489 (1913).
Dunet et al.: Chem Abstracts, vol 43, cols. 3805–6 (1949).
Blatt: Organic Syntheses, Coll., vol. II, pp. 526–7 (John Wiley and Sons, 1943).